(12) United States Patent
Elazary et al.

(10) Patent No.: US 9,050,723 B1
(45) Date of Patent: Jun. 9, 2015

(54) HUMAN AND ROBOTIC DISTRIBUTED OPERATING SYSTEM (HARD-OS)

(71) Applicants: Lior Elazary, Agoura Hills, CA (US); Daniel Frank Parks, II, Los Angeles, CA (US); Randolph Charles Voorhies, Culver City, CA (US)

(72) Inventors: Lior Elazary, Agoura Hills, CA (US); Daniel Frank Parks, II, Los Angeles, CA (US); Randolph Charles Voorhies, Culver City, CA (US)

(73) Assignee: inVia Robotics, LLC, Agoura Hills, CA (US)

( * ) Notice: Subject to any disclaimer, the term of this patent is extended or adjusted under 35 U.S.C. 154(b) by 0 days.

(21) Appl. No.: 14/328,916

(22) Filed: Jul. 11, 2014

(51) Int. Cl.
*H04W 28/00* (2009.01)
*B25J 9/16* (2006.01)
*G06F 11/07* (2006.01)

(52) U.S. Cl.
CPC ............. *B25J 9/163* (2013.01); *G06F 11/0793* (2013.01); *B25J 9/161* (2013.01)

(58) Field of Classification Search
CPC ....... G06Q 99/00; H04W 12/06; H04W 12/08
USPC .................. 700/257, 245, 258, 253; 318/567, 318/568.11; 340/501, 506, 525, 531, 340/539.11, 539.14; 726/1, 2, 4, 26
See application file for complete search history.

(56) References Cited

U.S. PATENT DOCUMENTS

| | | | | |
|---|---|---|---|---|
| 6,160,371 A * | 12/2000 | Tachikawa | ............... | 318/568.11 |
| 6,804,580 B1 * | 10/2004 | Stoddard et al. | ............. | 700/248 |
| 8,355,818 B2 * | 1/2013 | Nielsen et al. | ................ | 700/258 |
| 2006/0178777 A1 * | 8/2006 | Park et al. | ...................... | 700/245 |
| 2013/0340682 A1 * | 12/2013 | Bareket | ...................... | 119/14.02 |

* cited by examiner

*Primary Examiner* — Dalena Tran
(74) *Attorney, Agent, or Firm* — Los Angeles Patent Group; Arman Katiraei

(57) ABSTRACT

Some embodiments provide a human and robot distributed operating system (HaRD-OS). The HaRD-OS efficiently and dynamically connects different human operators and algorithms to multiple remotely deployed robots based on the task(s) that the robots are to complete. Some embodiments facilitate an action/perception loop between the operators, algorithms and robots by routing tasks between human operators or algorithms based on various routing polices including operator familiarity, aptitude, access rights, end user preference, time zones, costs, efficiency, latency, privacy concerns, etc. In the event of a fault, some embodiments route to the best operator or algorithm that is able to handle the particular fault with the required privileges. Some embodiments secure task guarantees to be completed at particular times, priorities or costs.

20 Claims, 13 Drawing Sheets

HUMAN AND ROBOTIC DISTRIBUTED OPERATING SYSTEM (HARD-OS)

TECHNICAL FIELD

The present invention relates to robotics and other devices that sense and react to the environment and in particular to a method of efficiently utilizing humans to account for the lack of perception in these devices. In other words, this invention improves on the ability of robots to perceive the world so that they can operate robustly and securely.

BACKGROUND ART

For the past few years, various advances in robotics have enabled robots to perform complicated tasks. These tasks include search and rescue, factory automation, precision surgeries, and basic assistance. However, most of the tasks involve well controlled environments that are mapped out in detail and where the problems are very constrained.

One sector in robotics that has not seen a great amount of growth is the assisted living space where a robot would be utilized to cook, clean and organize, serve and fetch items and assist in everyday life. These tasks are extremely important to the ever growing elderly population and the disabled, as they often have difficulty performing some basic, everyday tasks that we take for granted (e.g. getting themselves water to drink). These problems are not only limited to the elderly, since any human could utilize such robots to improve his or her own life.

The main difficulty with the tasks mentioned above has to do with the uncontrolled environments in which the robots would need to operate. These problems boil down to problems with perception, which define the environment for robots operating in the space. The perception problem is very evident in the manipulation of objects, where objects can take on many forms and shapes, as well as be located in many different places. For example, a glass of water can be located in many places and could contain various visual abnormalities (shadows, occlusions, viewpoint, semantic meanings, etc) which make the task of finding the glass difficult for various existing systems.

Even for robotic navigation there are still many challenges despite the fact that modern algorithms have been able to cope with basic navigation in fairly static environments using LIDAR and odometry. For example, an object could appear in front of the robot and the robot would need to understand what the object is in order to decide how to proceed. If robots had good perceptual systems, then they would be able to perform many tasks with extreme precision and in an optimal manner, with better outcomes than humans. For example, a robot would need to know all the locations of the game pieces in chess before computing the most optimal move and moving the correct piece to the appropriate position.

Even if the perceptual problem was to be solved, there are still other challenges that need to be solved in order to effectively provide assistance to the elderly, the disabled, or other humans. These problems include security and fault tolerance. Computer network security would need to be significantly addressed so as to reduce the potential harm to humans due to unauthorized use. Informational security to protect personal information would also be of high concern. Fault tolerance, which manifests itself as errors or lack of perception, would need to be addressed for the robot to be useful. Fault tolerance is also important, since the robot could potentially cause harm to people or get stuck without knowing how to complete the task.

SUMMARY OF THE INVENTION

It is objective to solve the previously mentioned problems in perception, security, and fault tolerance by facilitating the cooperations between humans and algorithms to compensate for the robot's shortcomings in these areas in an efficient manner. The proposed solution is to introduce a human and robot distributed operating system (HaRD-OS).

The HaRD-OS efficiently and dynamically connects different human operators and algorithms to multiple remotely deployed robots based on the task(s) that the robots are to complete. Specifically, the HaRD-OS selects a human operator that is best suited to handle a task confronting a robot manually or semi-autonomously or an algorithm that is best suited to handle the task fully autonomously, and the HaRD-OS switches human operators and algorithms as the tasks change and different skills sets are needed to operate the robot. A selected human operator or selected algorithm is permitted limited control over a robot in need of completing a task. The limited control restricts the human operator or algorithm to a certain subset of actuators and sensors of the robot needed to complete the task while other actuators and sensors are unusable by that human operator or algorithm for the task. Control is relinquished when the task is completed or an error is encountered at which time the HaRD-OS can again select a different human operator or algorithm for a subsequent task.

In this distributed manner, the HaRD-OS is able to have a single operator which can perform multiple jobs simultaneously while preventing unauthorized access to locations/items or rescuing the robot in the event of a fault. This in turn positions the robot as more of an extension of a human, allowing the robot to act as a tool that enables humans to work more efficiently. As a result, the humans are then able to multiplex between various tasks, utilizing robots to increase the amount of work they are able to perform. In addition, when a robot is performing an autonomous task or is idle, an operator can immediately be made available to another requesting robot for increased productivity.

Human input is also used to seed fault tolerance systems so as to achieve robust performance across a range of tasks, and to indicate when a robot is stuck. For example, a human might show the robot where on the floor it needs to pick up trash and while the robot is picking up the trash, the human can show a different robot where to pick up trash at another location. Additionally, since the human marked the location of the trash and its type, the information is used to seed the fault tolerance systems in the event that the robot tried to pick something up and failed or the object in its hand is not what it was supposed to pick up. The robot is then able to recover autonomously from this failure, but in the event that it is unable to proceed or detects a fault, then a human can be interrupted to help the problematic robot with the fault. For example, if the robot attempted to pick up a bottle and the bottle slipped and rolled out of the reach or view of the robot, the human can provide the robot with the new location of the bottle. Further, multiple operators can be involved in assisting a single robot. For instance, one operator can be guiding the robotic arm to pick up a coffee cup, and another operator can be looking for the location of the coffee pot so the target location for the next step of the task can be known immediately.

Accordingly, the HaRD-OS coordinates the synergy between humans, algorithms and robots. Since the system is distributed, there can be multiple computers/devices running HaRD-OS, which we will call HaRD-OS modules and nodes. HaRD-OS modules and nodes can be connected in many ways that facilitate the communication and coordination between human operators, algorithms, and robots to provide services/tasks to other people in need. Using the proposed HaRD-OS, a single operator supported by algorithms can perform multiple jobs simultaneously while being preventing unauthorized access to locations/items or can rescue the robot in the event of a fault. Further, multiple operators and algorithms can help a single robot during complex operations. A HaRD-OS node is able to manage task allocation, sub task allocation, security, and fault sensing/handling in the most efficient manner utilizing the humans, algorithms and robots as resources. In particular, a HaRD-OS node facilitates an action/perception loop between the operators, algorithms and robots. This is achieved by routing tasks between human operators or algorithms based on various routing polices. For example, the HaRD-OS can route subtasks based on operator familiarity, aptitude, access rights, end user preference, time zones, costs, efficiency, latency, privacy concerns, etc. In the event of a fault, the HaRD-OS node is able to route to the best operator or algorithm that is able to handle the particular fault with the required privileges. The node is also able to secure task guarantees to be completed at particular times, priorities or costs. This results in the whole system becoming very efficient at completing multiple tasks simultaneously such as cooking, cleaning, and organizing for multiple residences/end-users simultaneously.

Thus, some embodiments provide systems and methods for routing and scheduling tasks to facilitate control of any of a plurality of robots by (i) configuring an access control list that identifies human operators that are each qualified to perform some subset of tasks that partly involve human control of a robot and that also identify algorithms for instructing a robot in performing a subset of tasks fully autonomously without human control of the robot, (ii) receiving a request identifying a robot and a task for the robot to perform, (iii) determining based on a set of criteria, at least one human operator or algorithm for optimally controlling the robot in performance of the task, (iv) providing a particular human operator control of the robot when the task is one of the first set of tasks that partly involves human control and the particular human operator is identified within the access control list as being qualified to optimally perform the task in conformance of the set of criteria, and (v) providing a particular algorithm control of the robot when the task is one of the second set of tasks that the robot can complete fully autonomously and the algorithm comprises instructions for optimally completing the task fully autonomously in conformance of the set of criteria.

Some embodiments provide systems and methods for routing and scheduling tasks to facilitate control of remotely deployed robots by (i) receiving a request identifying a robot from geographically distributed robots and a task for the robot to perform, (ii) initializing the robot in performing the task by configuring the robot with an algorithm that instructs the robot in performing the task fully autonomously without human control of the robot, (iii) commencing operations of the robot under control of said algorithm, (iv) monitoring performance of the task by the robot under control of said algorithm, and (v) terminating control of the robot upon detecting completion of the task or a fault as a result of the monitoring.

BRIEF DESCRIPTION OF THE DRAWINGS

For a more complete understanding of the invention, reference is made to the following description and accompanying drawings, in which.

DETAILED DESCRIPTION

In the following detailed description, numerous details, examples, and embodiments are set forth and described. The described methods and systems are not limited to the embodiments set forth, and may be practiced without some of the specific details and examples discussed. Also, reference is made to the accompanying figures, which illustrate specific embodiments in which the methods and systems can be practiced. It is to be understood that other embodiments can be used and structural changes can be made without departing from the scope of the embodiments herein described.

Figure 1:
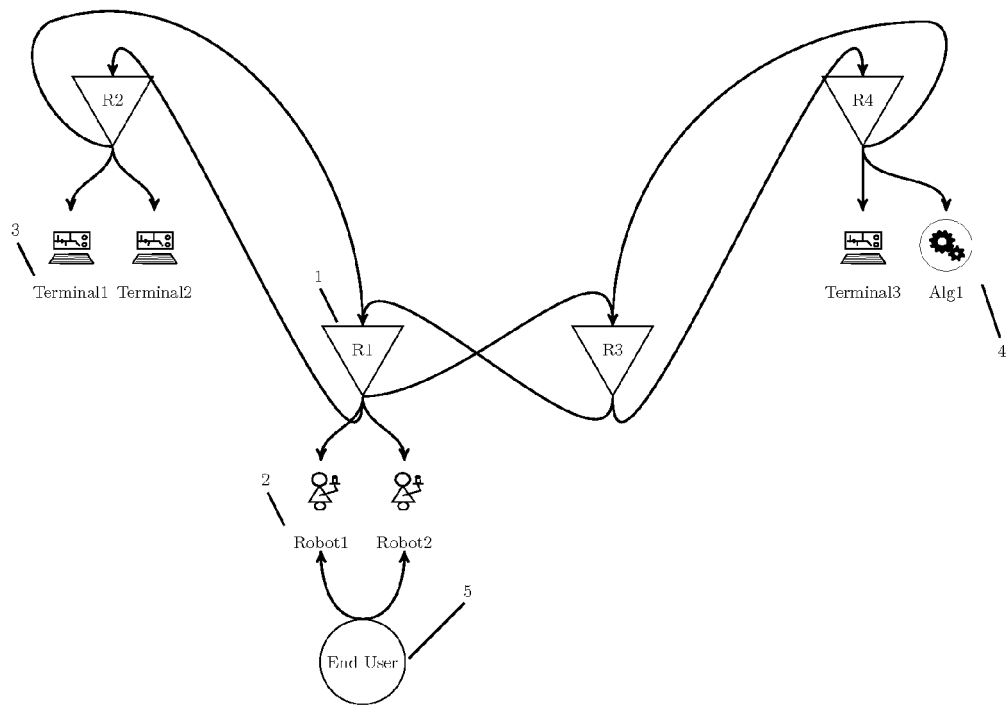
FIG. 1 shows an exemplary architecture for a preferred embodiment of the human and robot distributed operating system (HaRD-OS).

FIG. 1 shows an exemplary architecture for a preferred embodiment of the human and robot distributed operating system (HaRD-OS). In this scope, the human requesting the robots [2] to complete various tasks is referred to as the end user [5], while the humans controlling/communicating with the robots [2] to accomplish the task are referred to as the operators [3]. Algorithms [4] can also control the robots [2], but do so in an autonomous fashion and are often used in conjunction with the operators [3] to accomplish a task. The HaRD-OS is comprised of distributed modules such as R1 [1], R2, R3, and R4. The modules are used to facilitate communications between the robots [2], operators [3], and algorithms [4] as well as secure and monitor the tasks being performed. The HaRD-OS modules R1, R2, R3, and R4 can also communicate between themselves to optimally decide the best resources to use for a given task, wherein the resources can include the human operators [3], algorithms [4], as well as the robots [2] and their corresponding functionality, sensors, actuators, etc. During module setup, various proprieties such as resources availability, type (robot, algorithms, operator, node), and security keys are configured. The HaRD-OS modules then use this information to compute the optimal resources for a task requested by the end user [5].

Figure 2:
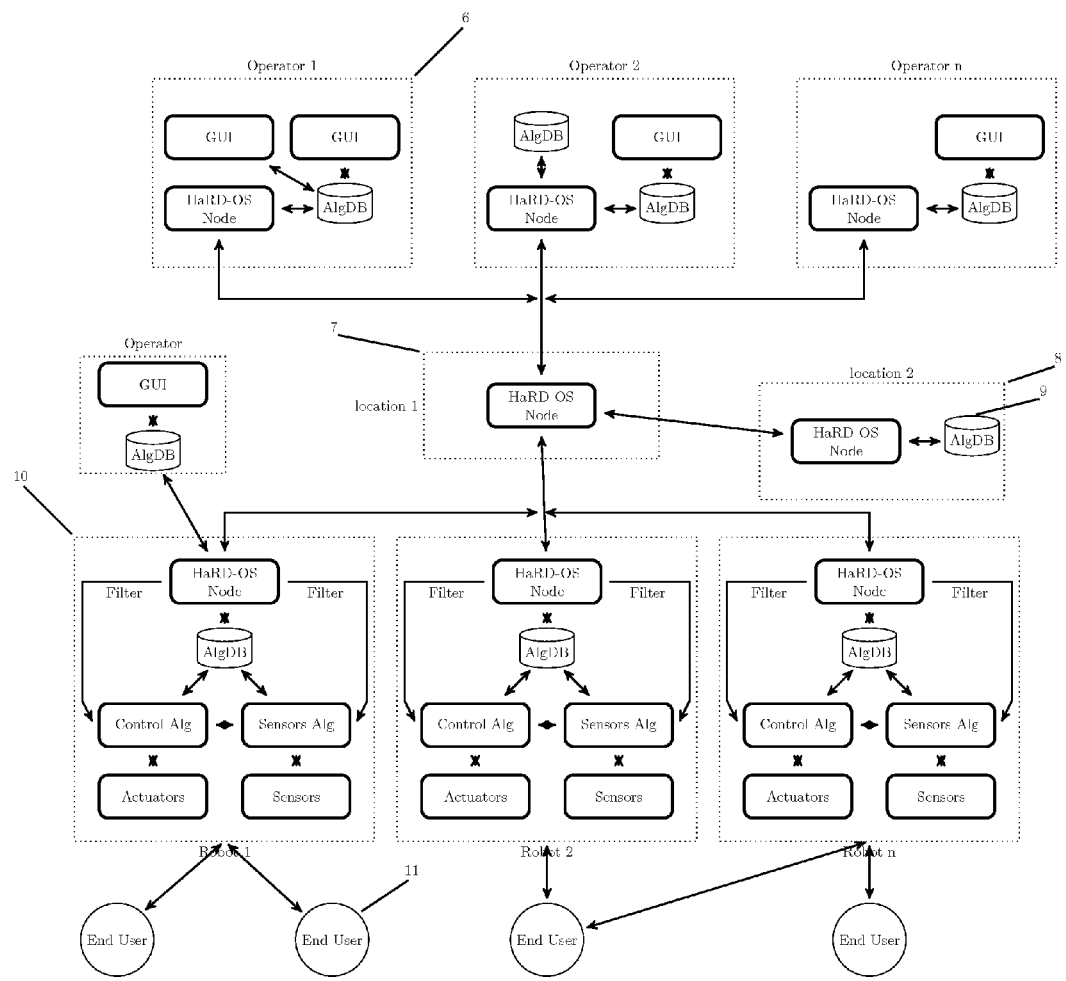
FIG. 2 shows components and connections associated with each HaRD-OS module of some embodiments.

FIG. 2 shows components and connections associated with each HaRD-OS module from FIG. 1. Each module runs a HaRD-OS node, and the various connections between modules shows an example of how they can be linked together. Each module can provide different capabilities for a robot. For instance, the robot [10] might only have a basic navigation algorithm, while HaRD-OS2 [8] might have a custom pizza-making algorithm. An Operator [6] is an interface where a human operator can manage and assist robots in the system. A HaRD-OS node[7,8] routes and schedules work between human operators, algorithms and robots. In a similar vein to an internet router, each HaRD-OS node only needs to know how to direct workflow to the next hop, and not the complete route. A robot [10] is any device with sensors and/or actuators that allows the system to perform a service for an end user [11].

Within each module there are multiple components that can be seen. Each HaRD-OS node is in charge of routing, scheduling, authenticating and authorizing the work that needs to be done. The Algorithm Database[9] (AlgDB) is a collection of autonomous and semi-autonomous algorithms that are available for the robot to use. These algorithms are designed to interface with the robot using standardized Control and Sensor algorithms that are installed on each robot. The flow of information between the nodes pertains to work that needs to be done (task request) as well as the task itself (task commands). The work can be accomplished purely by algorithms (autonomous behaviors such as those contained in HaRD-OS2 [8]) or along with human operators in semi-autonomous or manual control behavior such as done by Operator [6]. Lastly, end users [11] are the users that request work from the robot. For example, if the end-user requires the robot to bring him hot tea, the nodes would schedule the correct algorithms or human operators from the various locations to accomplished this work. Note that the robots, modules, and operators can be placed in various physical locations such as different rooms, buildings or countries. The end users can also request work from various robots based on their access rights.

One can note that in the Operator [6] various arrangements of connections can be made inside a module. Within an Operator, multiple GUIs can be connected to a single or multiple AlgDBs which are connected to a HaRD-OS node. This enables the system to take on any required topology. Additionally, the Operator [6] can be a separate business entity having their own topology of nodes providing services to end-users. One can also see in the robot [10] that a dedicated operator providing services to one robot can also be realized. It is also important to note that the HaRD-OS1 [7] can also belong to a different business entity providing autonomous or semiautonomous services.

Figure 3:
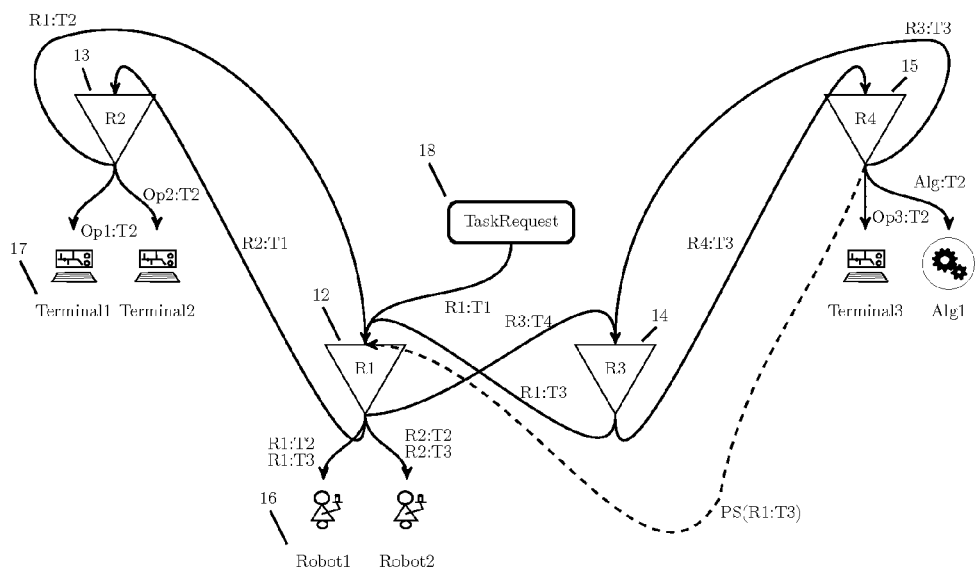
FIG. 3 shows how messages are passed through the various modules and nodes in FIG. 1 among multiple locations within the HaRD-OS system architecture of some embodiments.

FIG. 3 shows how messages are passed through the various modules and nodes in FIG. 1 among multiple locations within the HaRD-OS system architecture. When a request to execute task 1 (T1) is given through Task Request [18] module to module R1 [12], the module determines that the entity capable of executing the task is the R2 [13] module via the R2:T1 connection. When R2 [13] receives the request, it optimally chooses one of its operators [17] who is capable of executing the task. The human operator [17] then determines that the best action to take is to execute the T2 function on the robot at R1 [12] module. R2 [13] module will then forward and sign the request via the R1:T2 link to execute T2 on R1 [12], for which R1 [12] will execute directly on the robot.

FIG. 3 also shows another possible route for the completion of task R1:T1. One can see that the R1 [12] module would first decide to forward the request to R3 [14] via the R3:T4 path, for which R3 [14] will forward the request to R4 [15] via the R4:T3 path. Module R4 [15] has a human operator and an automated algorithm, both capable of executing the task. When module R4 [15] determines that the best entity capable of completing the task is the autonomous algorithm it passes the request to it. Alg1 would then pass the request back to its module R4 [15] which would forward the request to R3 [14] and ultimately to R1 [12] to be executed on the robot as task 3 (T3). However, a more efficient way of sending the request could be done via a permission slip, which would send the request directly to R1 [12] from R4 [15]. The permission slip is described in more detail later in the text.

I. Human and Robot Distributed Operating System (HARD-OS)

Figure 5:
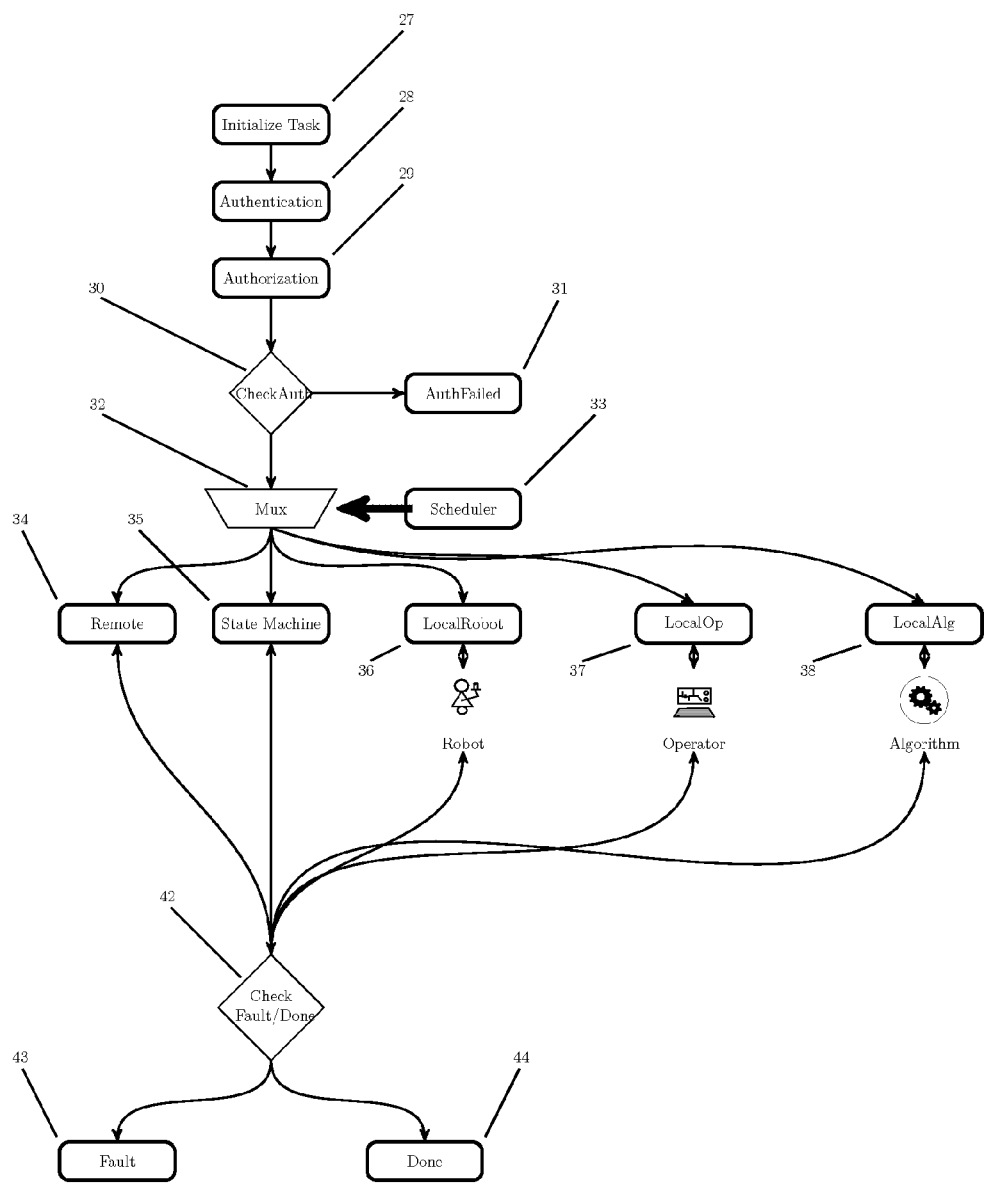
FIG. 5 illustrates the flow of data through the HaRD-OS node in accordance with some embodiments.

The HaRD-OS node is used to facilitate the assignments of tasks between operators, algorithms and robots in the most efficient means, as seen in FIG. 5. The goal of the node is to optimize the amount of completed tasks taking into consideration the ability of the operators and the robots. This allows the operators to perform multiple tasks simultaneously. Note that a single operator can perform multiple tasks without necessarily knowing which robot he/she is interacting/controlling. For example, if the operator is only used for marking objects for pick up, he/she might not know which robot is receiving the marked locations. Additionally, a different operator might be required to perform the actual pick up task either because of security privileges or due to the complexity of the task. Therefore the HaRD-OS node achieves the required work by routing tasks between human operators and algorithms based on various routing polices.

Figure 4:
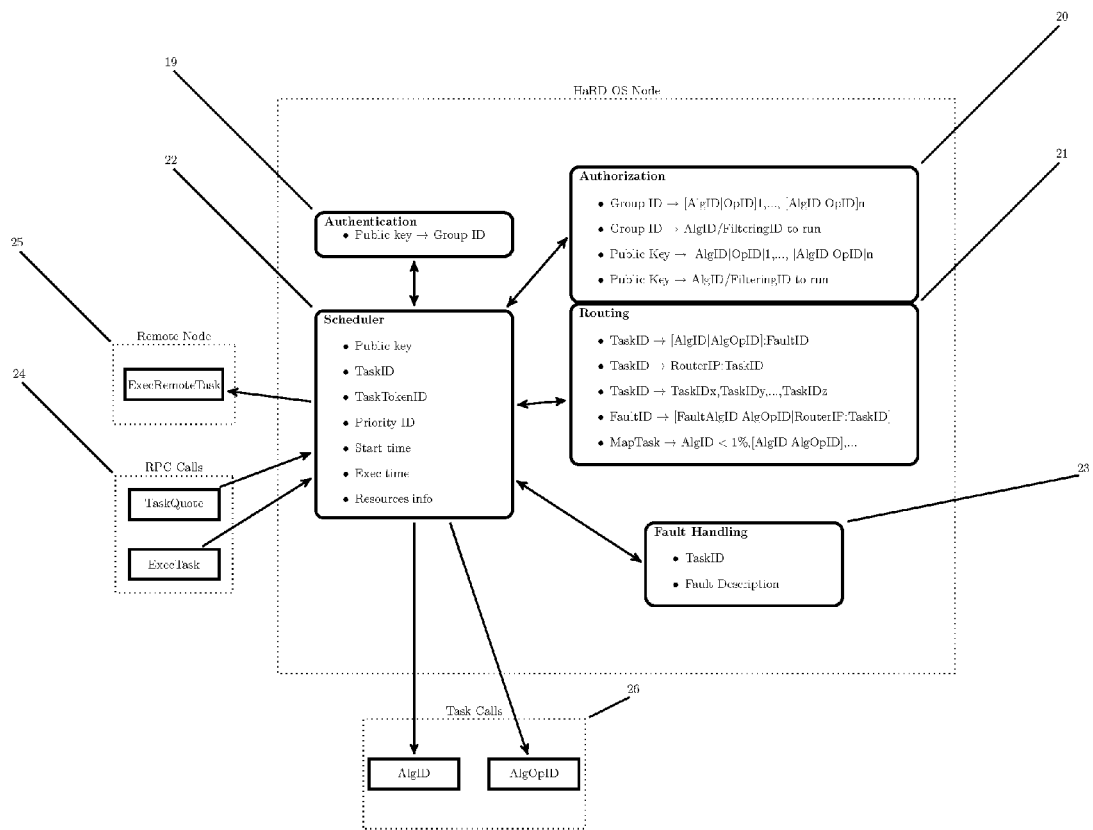
FIG. 4 illustrates the main functional components of the HaRD-OS node in accordance with some embodiments.

The main functional components of the HaRD-OS node are depicted in FIG. 4. These include the authentication[19] module to ensure that only particular users can execute tasks; the authorization[20] module, which is used to ensure that particular end users, algorithms or operators requests are only able to execute the tasks that are assigned to them; the routing [21] module contains a local structure of who (operator/algorithm/node) is able to complete a particular task; the scheduler [22] module is in charge of scheduling the tasks to the correct module, keeping track of the current task progress and checking for faults and routing tasks based on various polices; and the fault handling [23] module is designed as a safe guard to ensure that the task is being executed as desired. The Remote Procedure Call (RPC) to the HaRD-OS node can execute a task on the node or request for a task quote (RFQ), as shown in RPC [24] (among other standard RPC calls). On the other hand, the HaRD-OS node can execute specific algorithms either through an operator or a standalone algorithm as shown in task calls [26]. In addition, the HaRD-OS node can route tasks to other nodes via the remote task [25].

The flow of data through the HaRD-OS node is shown in FIG. 5. The node is composed of a task initialization[27], authentication[28], and authorization[29] modules which take a task request, parse, authenticate, and authorized it. Then, utilizing the multiplexer [32] the scheduler [33] routes the task to the best available resource module based on costs and efficiencies. The resource modules include remote HaRD-OS [34] nodes for other nodes to complete the tasks, a robot [36] which is capable of carrying out the task, a human operator [37] which is able to manipulate the robot to perform the task, or a state machine[35] that contains an algorithmically derived sequence of sub tasks/modules to complete the main task. Lastly, the check fault [42] module checks if the task is completed or if the task generated any faults, and routes appropriately.

When a task gets initialized via the task initialization[27] module, the authentication[28] module first checks that the entity issuing the request is allowed to communicate with the node. This is done by first checking the entity's public key against a table of known identifiers (i.e., ids) and ensuring that the command was signed using the stored entity's public key. Once the entity is authenticated, the authorization[29] module parses the request and extracts the task information about the request, which is used to ensure that the entity requesting the task has valid permissions. This is achieved by checking an Access Control Lists (ACLs) using the public key of the entity as the id. The results of these checks go into the auth check [30] process, which simply checks that all the requirements are met. If any of the requirements are not meet, then the request is sent to the auth fail [31] process, which could simply reject and log the unauthorized request. However, if the request is allowed to proceed, it would then get routed to the modules that are capable of completing the task. This is handled by the multiplexer [32] and the scheduler [33] which will use various parameters such as costs and efficiencies to determine the most optimal module to complete the task. In this context, cost is in reference to an actual monetary fee, while efficiency is determined in terms of time, fewest operations, and other optimal criteria.

Figure 6:
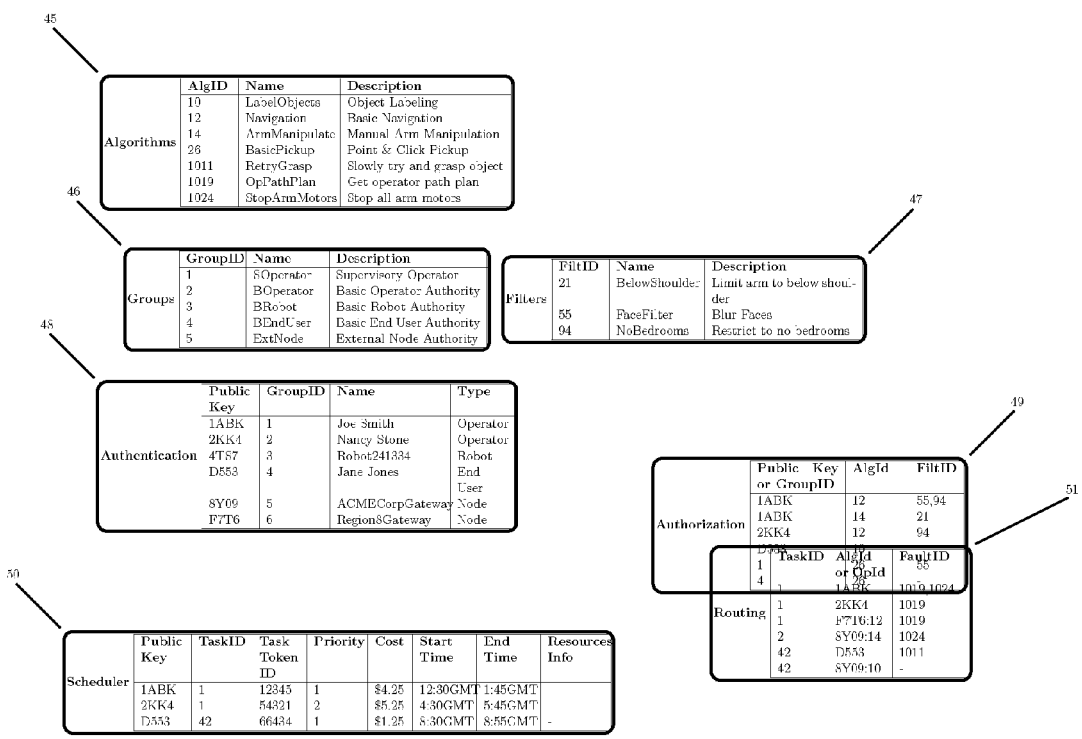
FIG. 6 illustrates HaRD-OS data tables of some embodiments.

An example configuration for a HaRD-OS implementation is shown in FIG. 6. There is a list of algorithms [45] that are available, which includes a list of regular algorithms and fault handling algorithms in the system. There is also a list of filters [47], which modulate the operation of various algorithm/operator during a task. A groups [46] table is also kept, which describes the different groups in the system. The authentication[48] table, lists all of the entities (operators, robots, end users, nodes, etc.) that have valid public keys recognized by the system. The authorization[49] table is shown describing what entity or group is authorized to run which algorithms, and which filters to run on top of them. The scheduler [50] table, shows the currently scheduled tasks in the system, along with their expected cost, priority, and unique task token, in addition to the id of each task and the algorithm or operator that will run the task. The routing [51] table, shows the possible algorithms or operators to which a particular TaskID can be routed, along with the associated fault handling algorithm that should be run when executing the task.

The scheduler [33] module has an array of modules to choose from to complete the task. These include a remote HaRD-OS [34] node located elsewhere which could complete the task, a state machine[35] module, which would contain an algorithmically derived sequence of sub tasks to complete, a robot [36] that can physically execute the task, a human operator [37] that is capable of manipulating the robot to execute the task, and an autonomous algorithm [38] that is also capable of autonomously manipulating the robot to complete the task. Note that not all modules are connected to a particular node. A node can contain several robots [36] with no operators or other modules. Likewise, a node can be linked to various operators [37] and algorithms [38] to just provide services to control robots at other remote locations.

While the scheduler [33] is communicating with the desired module to execute the task. The check fault [42] module is in charge of monitoring the progress of the execution of the task to check for any faults or abnormalities while the task is in progress. If a fault is detected, then the node passes the processing to a fault handling [43] module which will then attempt to fix the fault through various means described below. If however, the task is completed then processing is passed to the done[44] module to signal the completion of the task. This in turn would cause the node to move to a next state in its state machine[35] to execute a different task or return with a final completed task.

Figure 7:
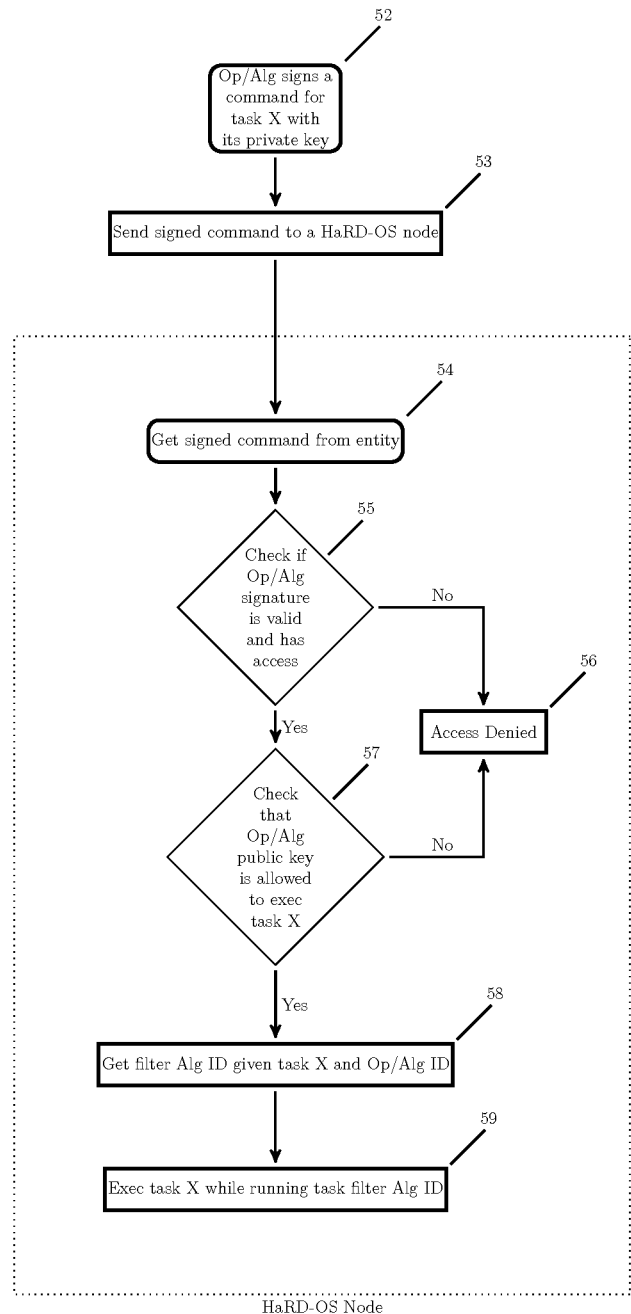
FIG. 7 shows the flow of information through the authentication/authorization modules.

To ensure that only authorized entities can execute allowed tasks as well as control what that entity can perform and sense during the task execution an auth check [30] module is utilized. The flow of information in this module is shown in FIG. 7. Both authorization and authentication are accomplished by using a pair of public/private keys as well as access control lists (ACLS) to ensure that only authorized entities are able to execute particular tasks. Each operator, node, algorithm, or end-user has a private key that is able to sign various information and thus authenticate itself to the system. This is done using a sign command [52] which signs the given command with the entity private key and then sends it to a given HaRD-OS node via the send command [53] module. When the HaRD-OS node receives the command via the command receive [54] function, it parses the command and checks the signature. This can be done in multiple ways. One simple way is to store the public-key of the entity in a database on the node as shown in authentication[19]. The node can then check the signature of the command to ensure that the entity is authorized to run a particular command using the check auth [55]. This implementation can take on various forms but the simplest would be to use an access control list using the ACL [57] module with public keys and their matching authorizations. The authorizations would then have a direct effect on which tasks an end-user can request and an operator or function can perform. Note that each node in the system also contains a private key which is used to sign commands. This means that a node can sign commands to forward tasks or get requests from other nodes up the chain as well as verify them by signing them.

To help with key management, a particular node also has the ability to sign permission slips, which would allow third party public keys from a given node to execute particular tasks given that the messages are signed with a permission slip from a trusted party. This will allow the robot to trust the incoming request based on the permission slip and the matching public key to execute the given task. In addition to the command, the permission slip could contain any of the authorized algorithms included on the HaRD-OS node. The permission slip could also have expiration information, which will render the slip void. When a node wants to use the permission slip, it can simply include the slip in the packet, where the receiving node can check (using the public keys of both entities) that the permission slip is valid.

The authorization in the node is handled by the command filter [58], which fetches an algorithm to act as a filter that manipulates the robot sensors and controls based on the task/operator access rights. The execution of the task is then handled by the command run [59] module which applies the filter algorithm to the robot sensors or controllers to only enable the robot to perform the particular tasks. This can be seen in the second item of authorization[20]. This item is able to apply a filter function or a set of constraints to the task. For example, if the task was to pick up objects from the floor, the arm of the robot could be filtered to only be able to operate below the robot waist and only place objects in the robots tray. In addition, any sensors which look above the robot waist would be disabled or blocked out. For example, a face detection algorithm could be run to blur-out the faces if the task does not require interaction with the end-user. If a particular sub task does require authorization not given to the current operator, the node would route the task to another operator with the appropriate authorization, or possibly recruit the help of a supervisor who can temporarily upgrade privileges of an available operator. It is important to note that the operators or algorithms can be located in multiple locations around the globe with various access rights assigned by the end-user or the router administrator. Each node is responsible for authenticating and authorizing messages that it receives to ensure only the appropriate operators are providing the correct tasks.

In this scope, we define Operator ID (OpID) to be a unique number that identifies a particular human operator, and Algorithm ID (AlgID) to be a unique number that identifies a particular algorithm to be used. A Task ID (TaskID) is a unique identifier for a particular requested task that can be translated into a combination of OpIDs and AlgIDs. The routing module [21] contains a database with which specific algorithms or operators are able to complete a given task. For example, the module might route all baking related tasks to a particular OpID, but might route object pickup tasks to an AlgID of a generic grasping function. This is shown in item 1, which maps a TaskID to either an AlgID or an Operator ID (OpID). A fault handling id is also provided to know how to route in the case of a fault. In addition a TaskID can be mapped to another node with ID:TaskID. This means that a different node would be in charge of completing the task. This is shown as item 2, which maps a TaskID to a NodeID (such as IP address). Lastly, a given TaskID can map to a sequence of TaskIDs. The sequence will be tasks that are going to be executed in that order. Note that some tasks description can include algorithms which will be checked to see whether to proceed to the next task. For example, when using text-to-speech to map end-user requests to TaskIDs, the system can first use a Text to Speech (TTS) algorithm and if the confidence of the translation is below a threshold, it can route it to another algorithm or operator.

The scheduler [22] module is in charge of scheduling, routing, and monitoring the execution of tasks. The scheduler will contain various information on the tasks as they are being executed, such as what node and algorithm/operator is currently in control, how long the task has been running, and any faults that have been generated. In addition, the scheduler can receive Request for Quotes (RFQs) to get the time and cost quote of the required task. Quotes are provided back to the RFQ originator, and help a node make decisions on scheduling or routing the tasks using programmed algorithms. While utilizing the routing [21] database, the scheduler would then route a task given various criteria. For example, the scheduler would route tasks based on operator familiarity, aptitude, access rights, end user preference, time zones, costs and efficiencies, privacy concerns, etc. Additionally, in the event of a fault the scheduler is able to route the task to the best operator or algorithm that is able to handle the particular fault with the required privileges. The scheduler would also contain information on how to complete a task by mapping it to various sub-tasks. These sub-tasks might include autonomous behavior or operator assisted tasks.

Figure 11:
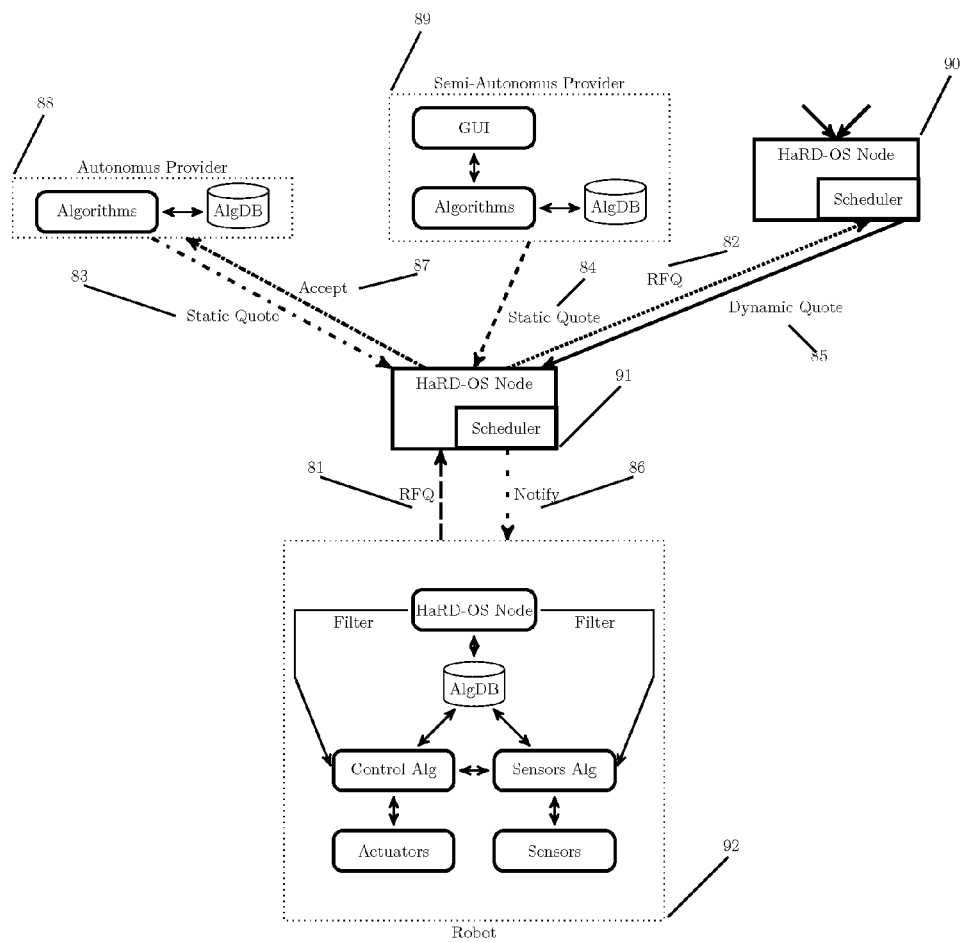
FIG. 11 illustrates the scheduling of a task in accordance with some embodiments.

A task scheduling example can be found in FIG. 11. The first step is for an authorized node to request a task. This causes the scheduler to send a request for quote (RFQ) [81] to collect prospective operators' or algorithms' cost, availability, and other criteria. An RFQ will have a deadline, by which all quotes must be returned. HaRD-OS Nodes have access to static quotes [83, 84] associated with operators or algorithms that are directly connected to it. The node can then propagate its own RFQ [82] to a higher-level HaRD-OS node, with its own set of operators/algorithms and/or other nodes. These will return a bundled set of dynamic quotes [85], which are similar to the static quotes [83, 84] but are computed based on current resource utilization. An RFQ can, in this way, propagate up the network hierarchy if so desired. Nodes that choose to respond will do so with a quote that is good for a certain amount of time before expiring. The scheduler will collect the currently available quotes, and make its decision based on the weighted criteria. The scheduler will then accept the quote [87] of the winning node, and then notify [86] the original requesting node of the result.

When a scheduler executes a task it creates a unique token named Task Token [96], which is used as an indicator for RPC calls to be able to execute tasks on the node. The reason for this is that resources such as humans, actuators and sensors are often mutually exclusive and cannot operate on two tasks at the same time on the same robot (i.e. a robot cannot go to the kitchen and the family room at the same time). Therefore the token supplies the scheduler with the knowledge that a given RPC call is associated with the current running task, which would be coming from a remote node. In turn, this allows the scheduler to block other tasks from coming in if they do not belong to the current task. This can be thought of as opening a tunnel for task executions, that only commands in that tunnel can be executed. Other tasks can be chosen to be blocked or continued depending on needs and resources. For example, if the node on the robot requested to navigate to the kitchen from a remote node, the remote node would be able to execute the navigate function using the task token. However, if another node requests the navigate function, but did not supply the correct token, the receiving HaRD-OS node would block the call or reject it until the main task is finished.

Figure 12:
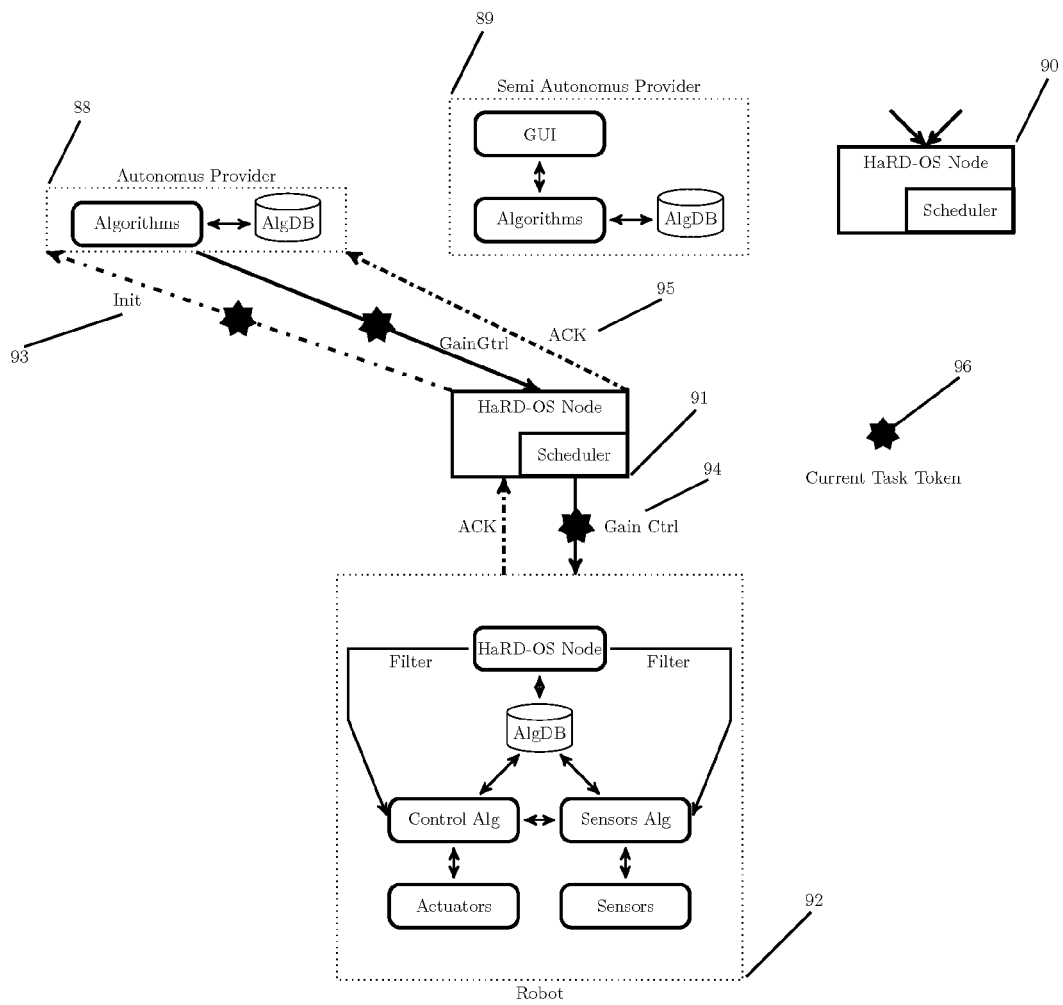
FIG. 12 illustrates the scheduler initiating a task in accordance with some embodiments.

A task initiation example is shown in FIG. 12. When the scheduler [90] determines that it is time to initiate a task (this could happen immediately after the quote is returned, or at a later scheduled time), the scheduler notifies the appropriate provider that the task is initiated [93] along with the new Task Token[96]. That provider will then attempt to gain control [94] using the Task Token. If the robot is functioning and available to perform the task, it will acknowledge that control has been given[95].

Any node can request a task, given they have authorization to perform the task on a given robot. For example when an end user verbally requests the robot to fetch them the TV remote, a TTS task is generated, the TTS gets routed to a node (possibly the node on the robot) and the node then converts the verbal request to a known TaskID for find and pickup object, which is then routed appropriately. Alternatively, the robot could generate its own task, such as when it detects low battery and has to proceed to its charging station. Finally, a human operator can request a task, if for instance, a family member requests the system to check on the health of an elderly person who has a robot on the premises.

Another process of the node is to seed and route the detection of faults and fault recovery. This is achieved in the fault handling [23] module. When a user requests a task, the operator or function would help in monitoring the task as well as the seeding of faults. The seeding of faults involves identifying the appropriate node to define the fault seed, and the definition itself, which is composed of task expectations and fault priority. Task expectations are various parameter and/or sensor ranges for what would be considered a correct implementation of the task, and the fault priority is the ranking of this fault with respect to other faults that might occur. Task expectations can be as simple as a task timeout or a complex set of action sequences that can be made in a particular order and configuration. Task expectations can involve motor current and velocity limits, and robotic workspace constraints. Further it can consist of other algorithms that take sensor information and attempt to detect faults, such as a collision detection fault algorithm that constantly monitors the robot's movement for any collisions. For common tasks, these fault seeds could be retrieved autonomously from stored seeds or dynamically generated from an algorithm. Additionally, fault monitoring can be achieved by an operator, who would be monitoring the progress of a task and press the appropriate fault button to generate a fault if something goes wrong. For instance the operator could watch video of the robot as it is picking up a cup and press the "Object Dropped Fault" button if the cup falls during the pickup, which would send a message to the controlling node. As a result, the scheduler would now have task related expectations as well as fault handling priorities. If any of the expectations are not met, then the appropriate fault would be generated and passed to the node via an RPC call. The scheduler would then route to a capable operator or algorithm based on the routing policies in routing [21]. Fault descriptions can include but are not limited to arm joint angles, wheel velocities, robot location, robot acceleration, power draw, locations of known obstacles, work space violations (detected thought cameras or range sensors), etc. Note that faults are not required to be sensed by the seeds, but could also be caused by preprogrammed faults such as low battery, sensor malfunction, various sensors thresholds, power interruptions, emergency stop buttons (E-stops), emergency voice commands (HELP, STOP, etc.), buttons, or operator generated faults.

Another way of providing the fault seeds is by simulating tasks beforehand, using kinematics and dynamics simulations, and seeding the fault sensing algorithms based on the results. If, while the robot is performing the task, it veers too far from the expected simulation a fault would be generated, which the node would route to a capable operator. The simulations can also be used to ensure that an operator with basic authorization is performing the task as expected. If the expectation between the operator and the simulations are not met, a fault would be generated. The node would then route the task to a more authorized operator to handle the fault or to check the situation.

In the event of a fault, it is then the scheduler's job to route the fault to the appropriate location that would be able to handle the fault. This location can be an operator or an autonomous algorithm that is capable and authorized to handle the fault. Fault handling might be routed and triggered multiple times before eventually reaching a conclusion. For example, one such fault recovery might be decided based on sensory information from the gripper. If the gripper is not holding something, then the router could route the fault to an autonomous algorithm which would recover from the fault based on learned behavior and fault recovery. However, if the gripper is holding a glass of water, then the fault might be routed to a human operator to handle the fault.

Figure 13:
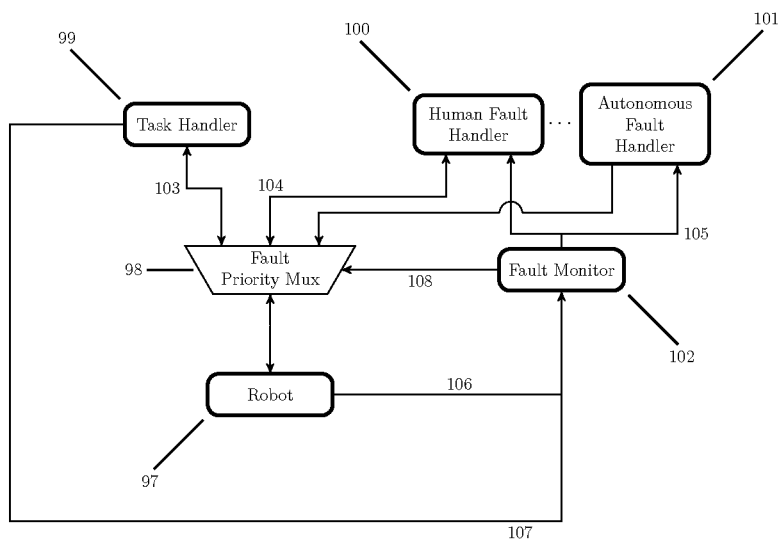
FIG. 13 illustrates the data flow during the fault handling procedures of some embodiments.

FIG. 13 shows the detailed fault handling procedures that are shown as fault handling [23] in FIG. 4. Upon acceptance of a task by a Task Handler [99], a set of Fault Handlers (e.g. [100, 101]) and a Fault Monitor [102] are instantiated by the system. Fault Handlers are human operators and algorithms that are authorized to assist with the recovery of different faults. This Fault Monitor [102] is configured with specific task expectations which it utilizes to detect a fault. For example, task expectations can involve motor current and velocity limits or robotic workspace constraints. Further it can consist of other algorithms that take sensor information and attempt to detect faults, such as a collision detection fault algorithm that constantly monitors the robot's movement and surroundings for any collisions. During task fulfillment, selected parameters from the robot (such as sensor readings, or actuator commands) as well as internal parameters from the Task Handler [99] are routed to a Fault Monitor [102] for checking (see [106] and [103]). When data sent to a Fault Monitor [102] falls outside of acceptable tolerances, a fault is triggered. Triggering a fault notifies the Fault Priority Multiplexer [98] to switch control to an appropriate Fault Handler [100, 101] via an RPC call [108]. Additionally, the Fault Handler [100, 101] is notified through an RPC call [105] that it now has control over a subset of robot functionality. Once notified, a Fault Handler [100, 101] works to bring the subset of parameters into nominal ranges through use of the granted functionality. Once nominal parameter values are achieved, the Fault Monitor [102] may either return control of the robot functionality to the Task Handler [99], or it may terminate the task and trigger a Task Failed Fault. At any time, the Fault Monitor [102] may terminate the Fault Handler [100, 101] with a Task Failed Fault if it determines that fault handling has failed. Upon triggering a Task Failed Fault, a high priority service request is triggered and sent to a technical support team for resolution. If nominal parameters are achieved by the Fault Handler [100, 101], the FaultMonitor [102] may: terminate the task with a Task Failed Fault, return control of the robot functionality to the original Task Handler [99], or terminate the original Task Handler [99] and request fulfillment by a different Task Handler.

The computational modules used in all the systems can be in any forms including micro-controllers, GPUs, ASIC, CPUs, etc.

Information between the nodes and the various computational devices can be transmitted using various means. For example WIFI, Ethernet, serial communication, USB, radio frequency, etc. These communications would mostly be over encrypted channels but are not limited to that (e.g. IPSec). Additionally, the network between the modules could be private, public or a combination of both. Various protocols could be utilized like TCP/IP, VPNs, IPSec, etc.

II. Robot Hardware

Figure 8:
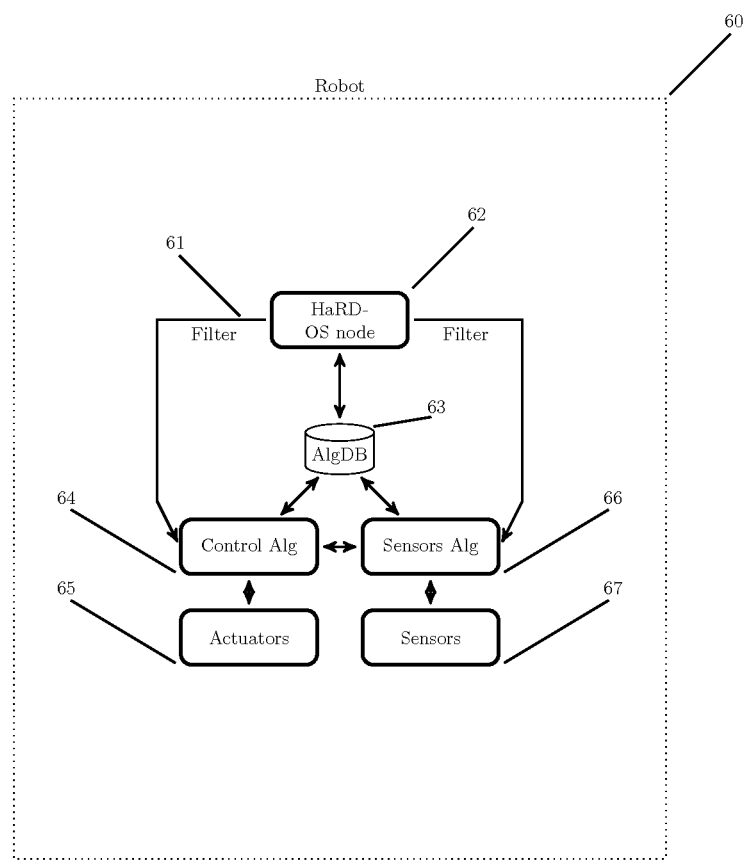
FIG. 8 presents an example of the robot hardware which consists of any embodiment that can both sense and manipulate objects around it as well as itself.
Figure 9:
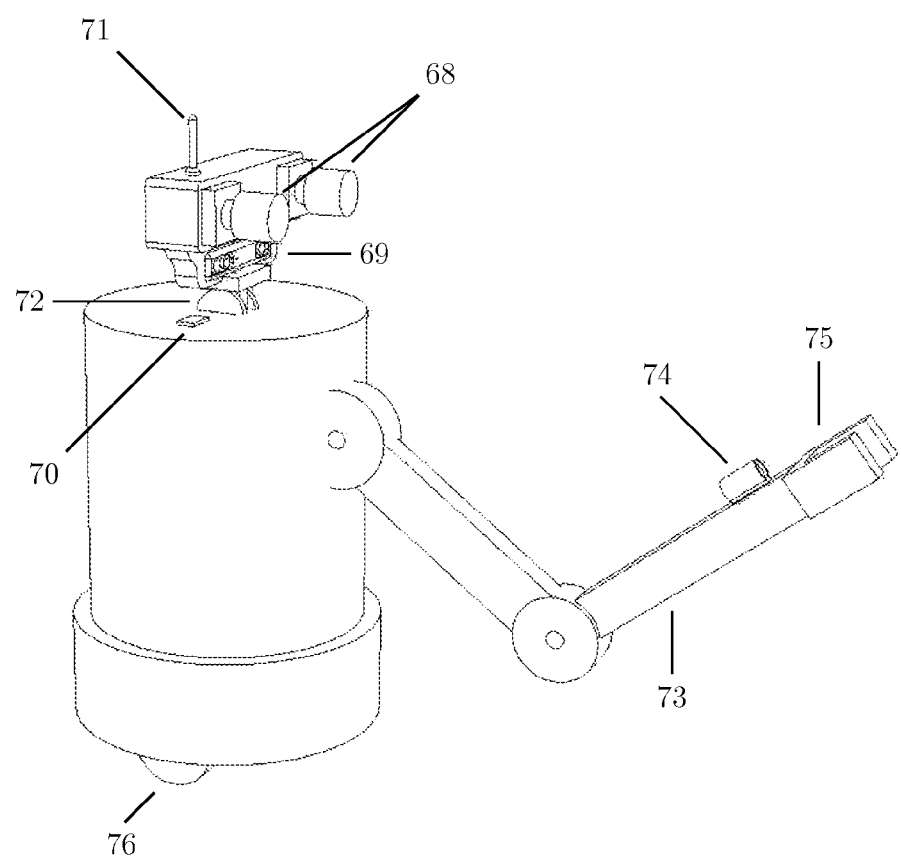
FIG. 9 presents an example embodiment of a robot.

The robot hardware in FIG. 8 includes any embodiment that can both sense and manipulate objects around it as well as itself. This includes but is not limited to robotic platforms that are capable of manipulating objects using a robotic armor are capable of navigating using a mobile platform (RobotActuators [65]). The robotic platform does not necessarily need to be mobile or manipulate objects. One can note that many manifestations of hardware platforms could be developed which are cable of manipulating objects or themselves in many ways. FIG. 9 depicts one such embodiment but is obviously not limited to that platform. One or multiple arms [73] could be mounted on the robot as well as various means of locomotion such as legs, wheels, tracks, etc [76]. The robot could grasp, lift, and move objects, open and close doors, and manipulate objects. The robot could also look for objects or people, as well as identify unsafe situations, such as a gas stove top left on, or the presence of an intruder using cameras [68], or other ranging sensors [69] mounted on pan-tilt heads [72] or at the ends of manipulators [74]. Communication with other HaRD-OS nodes could take place over a wireless communications link [71].

Additionally, the robotic hardware contains various sensors to sense its environment (RobotSensors [67]). These can include but are not limited to laser range finders, encoders, gps, ultrasonic sensors, tactile sensors, 3D RGB sensors, visual sensors, cameras, etc. The sensors can be preprocessed using various algorithms for both embodiments as well as compression before propagating further down the chain of the perceptual/action loop. For example, a noisy sensor might run a filtering algorithm (like a Kalman filter) to smooth out its output or other, more complicated filtering/processing algorithms.

In FIG. 8, one can see that the manipulators RobotActuators [65] are controlled by control algorithms RobotControlAlg [64] to provide low level control of the robotic actuators through a standardized interface as is common in the field. For example, a PID controller could be utilized as a RobotControlAlg [64] or a more elaborate dynamic controller could be used. The robot [60] also contains Robot-Sensors [67] and RobotSensorsAlg [66] to process the sensor data. These sensor algorithms can include low level feature extraction, filtering or any other preprocessing methods.

The HaRD-OS Node[62] is in charge of routing, scheduling, authorizing, and authenticating various commands given to the robot. While the RobotAlgDB [63] contains a database with various algorithms that are used to control the robot. These algorithms can include low level primitives such as moving an actuator to a particular position or more complicated algorithms such as navigation, reaching and grasping or complete tasks. One should note that these algorithms can be stored in any manner including a simple DB structure with pointers to their algorithms.

Both the RobotSensorsAlg [66] and RobotControlAlg [64] can be filtered by a signal filter [61] which will change the module's behavior with respect to the input or output signal from RobotAlgDB [63]. For example, the controller can change its gains when picking up objects off of the floor vs. manipulating doors. Additionally, as part of the security control, the robot can be filtered to inhibit the actuators from performing various manipulations tasks. For example, the robot could be filtered to prevent access to restricted rooms, or from being able to reach above a particular height with a particular arm configurations if the authorization does not allow it. Lastly, the RobotSensorsAlg [66] can be filtered to not allow various sensor information from being passed or additionally changing the sensor filters. For example, the sensors algorithms can be filtered to not send faces when utilizing a visual sensor or the location of the robot in the map.

III. Operator Hardware

Figure 10:
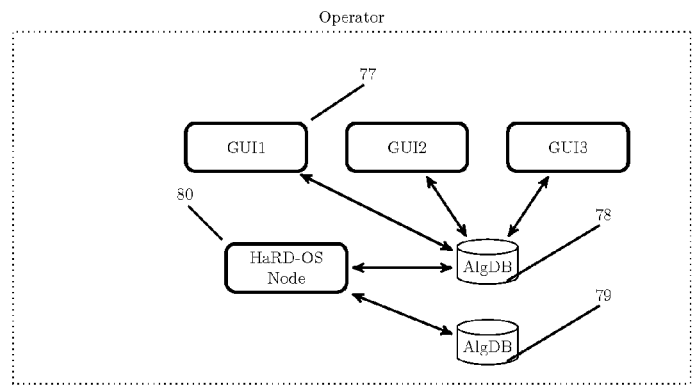
FIG. 10 presents an example of how an operator is connected to the HaRD-OS node.

An example of how an operator connected node is shown in FIG. 10. The HaRD-OS Node[80] is connected to three operators through a GUI [77] which pass through a set of algorithms database AlgDB [78]. The algorithms in the database connected to the operator are there to help the operator with the task. The operator would typically have access to a keyboard, joystick, video and audio feeds, depth maps, as well as motor force and robot pressure/proximity sensors. There would also be custom information that is provided based on the task. For example, for a navigational task a map can be shown in the GUI which the operator will then use to select the destination as well as any foreseen obstacles. A searching and grasping task could show the end effector camera where the operator could click on the object to enable autonomous visual grasping via visual serving. Other tasks can include object labeling or label confirmation (label+image pair provided to operator for confirmation), object affordance marking, visual searching, or any other required task. Lastly, the HaRD-OS Node[80] also connects AlgDB2 [79] which enables autonomous tasks to be executed without operator assistance. Once again, the HaRD-OS Node[80] will be in charge of authenticating each of the operators/algorithms via their public keys to the set of tasks they are allowed to perform. The HaRD-OS Node[80] will also schedule the correct operator or algorithm based on the required parameters from the task such as time, costs, efficiency, affinity, etc. For example, while one robot would be performing a navigation task, the same operator could mark the locations of objects for another robot in a different location.

IV. HaRD-OS Node Example

Figure 14:
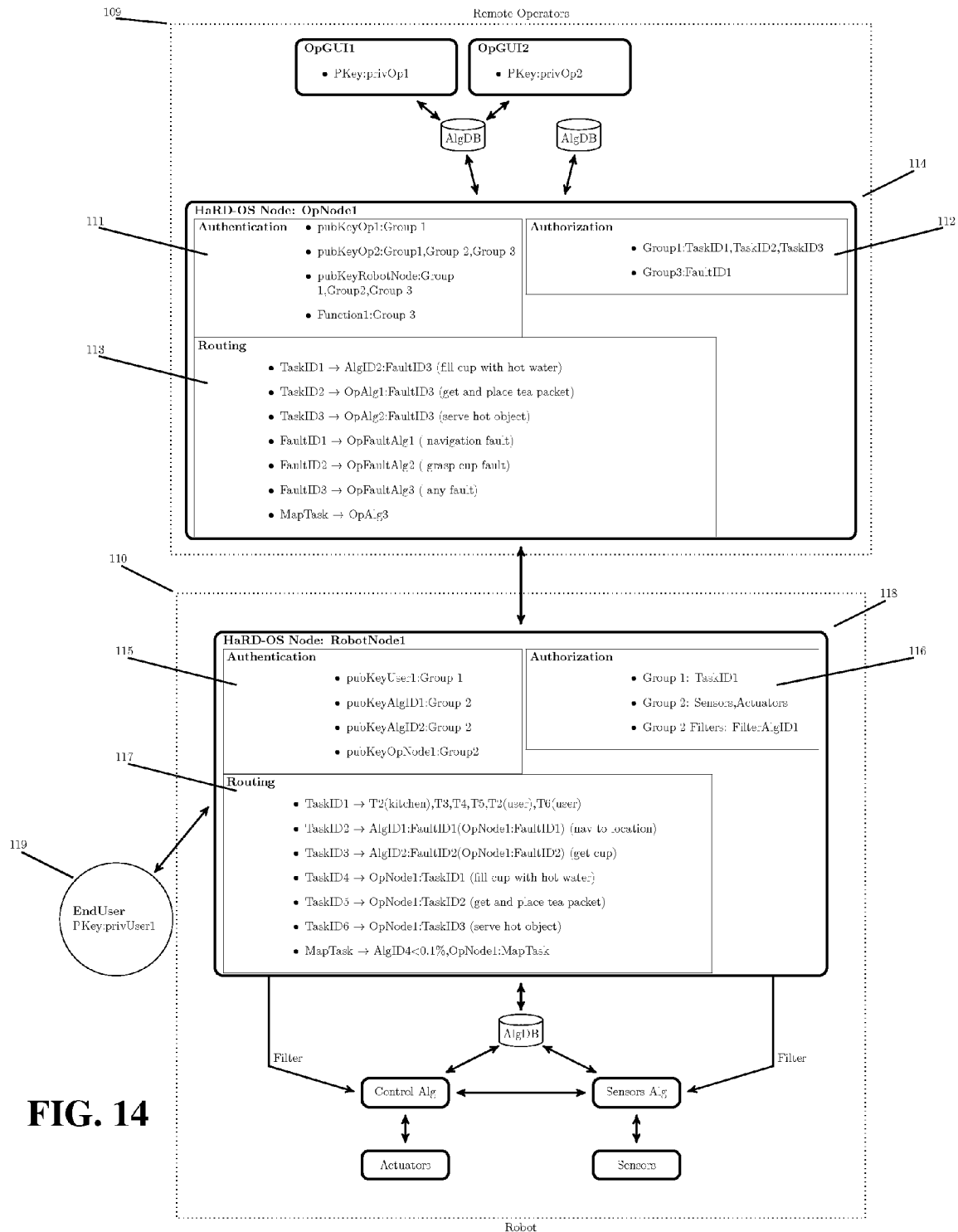
FIG. 14 presents an example configuration for two HaRD-OS nodes in accordance with some embodiments.

In this section we are going to go over a particular example of the HaRD-OS node. A simple layout is shown in FIG. 14 with two locations. The first location, robot [110] contains the robot with a Robot Node, and the second location, operators [109], has a couple of operators with an operator node. Additionally, each node shows its operator authentication[111], operator authorization[112], and operator routing [113] policies. Lastly, an end user [119] is added which can interact with the robot. It is important to note that the nodes could be implemented in various ways and connected in multiple topologies to achieve the required policies and implementation. The example will follow an end-user asking the robot to bring him hot tea.

When the end-user asks the robot for hot tea, the first step is to interpret what the user wants and map it to a particular task ID. This is achieved by first assembling a TaskRequest packet with the end-user request as a payload and a random generated number called the TaskToken. The TaskToken is used to keep track of the current task commands that might be coming from multiple locations (see description above). In this example, the task token will be 12341234. The TaskRequest packet could include the robot id for the robot that generated the task, the task body and a mapped task ID. The task body is a raw form of the task which would need to be mapped to a task ID that the router can understand. This mapping can be done autonomously on the robot (via text-to-speech, tablet/phone control, robot lcd panel), or with the assisted help of an operator. If no autonomous mapping succeeded with mapping the task ID, then the task ID would remain NULL. Lastly, the TaskRequest packet is signed using the end-user private key (privUser1). In addition, each TaskHeader embedded in each packet would contain an incrementing window number for replay protection, signed text, weight, fault definition as well as other parameters required to complete the task.

The robot node[118] on the robot would then check the TaskRequest signature using robot authentication[115] to determine if the end-user is authorized to make such task requests, and if the taskID is missing. If the taskID is NULL then the TaskRequest would get routed to an authorized algorithm or an operator that is able to map the task to a known taskID as shown in robot routing [117]. If the confidence from any such algorithms (such as text-to-speech) is below a threshold (or any function specified in the routing table such as end-user response), then the Robot OS Node will route to the next algorithm or operator in the routing list. In the current example the robot routing [117] is set to route any mapping tasks to algorithm id 4. If that algorithm's confidence is below 1%, then the interpretation task is to be routed to the OpNode1, which will be routed to an operator.

Once a taskID is established (in this example TaskID1), the robot node[118] would route the taskID to the appropriate location capable of achieving the task. This is done by using the routing policy robot routing [117], which takes into account various parameters as well as the TaskID routing database. The TaskID routing database contains the TaskID and a map to an algorithm, operator, sequence of taskIDs or a router capable of further handling the TaskID. In this example the TaskID would be mapped to a sequence of subTaskIDs in which case each subTaskID would map to a local algorithms/operators or a different router. Alternatively, the SubTaskID or TaskID would be mapped to an AlgorithmID that can be used to autonomously achieve the task or complete the task with an operator assistance. If an operator assistance is required, the router would route the Task to an operator based on various routing policies.

In the current example the scheduler in the robot node[118] will see that TaskID1 maps to a sequence of tasks, where the next task to be executed is TaskID2. TaskID2 maps to a navigation algorithm which moves the robot autonomously from its current location to a destination given by the parameter (in this case the kitchen). Additionally, the FaultID1 algorithm will be used to verify that the task is being executed correctly. The scheduler in robot node[118] will then fork another process with AlgID1 giving it the kitchen parameter. This is achieved by creating a task packet with TaskToken 12341234, the parameter and other useful information and send it to AlgID1. While AlgID1 is running, the scheduler will check for faults using FaultID1.

Additionally, as AlgID1 will send commands to Actuators or check Sensors, it will sign these requests using its private key privAlgID1. The scheduler in the robot node[118] will verify that it does have permissions to exec the commands needed and that the task token matches the current running task. The scheduler would also filter/secure any commands or sensors given the filter listed in robot authorization[116]. This in turn will send the filter signal described above to limit access. In the current example, AlgID1 is part of Group2 which is filtered by FilterAlgID1. This algorithm prevents navigation to any unauthorized locations, such as a particular bedroom.

When AlgID1 achieves its tasks, it will signal the scheduler with the Task-Token that the current subtask is done. This will cause the scheduler to fork the next subtask in robot routing [117]. In the current example, this is TaskID3 which maps to AlgID2 with FaultID2 as the fault algorithm. Therefore, as AlgID2 sends commands to robot node[118] as described above, the scheduler checks for any faults using the algorithms or operators described in the routing table. In the event of a fault, the scheduler will pause the robot (or place it in any configuration described by the fault algorithm), and route it to a fault handler entity.

In the current example, the task was to get a cup from a dispenser, and the fault algorithm checks that there is a cup in the gripper (among other checks). If the gripper did not sense the cup, then FaultID2 will trigger which would cause the scheduler to assemble a fault packet with the current TaskToken. Since robot routing [117] shows that Fault2 needs to be routed to OpNode1, the robot node[118] will sign the packet using its private key and send the packet to OpNode1. The scheduler on OpNode1 will receive the packet and check its operator routing [113] on how to route this fault. The decision could be made based on various criteria such as operator affinity, cost, security, etc. In this example, OpGUI2 is the only one with sufficient permissions to fix the fault.

The scheduler in operator node[114] will send and receive signed packets from OpGUI2 which contains commands to use sensors or activate actuators on the robot. The scheduler will then sign these packets with its own private key (privOpNode1) and send it to robot node[118]. As a result, the scheduler on robot node[118] will check for the current signatures (using pubKeyOpNode1) and permissions and perform the commands. It will also verify the TaskToken to ensure that the current task is the one that is being fixed. When the fault is fixed, the scheduler on operator node[114] will be signaled, which will in turn signal robot node[118].

When the scheduler on robot node[118] gets to TaskID4, it will need to route it to a different node in order to complete the sub task (in this example, OpNode1). The scheduler on the robot node[118] will thus assemble a packet with the current TaskToken and sign it using its private key. OpNode1 will get the packet and verify the public key and the permissions. Using operator routing [113], the scheduler on the operator node[114] will route the task to AlgID2, which is an autonomous algorithm that is used to fill the cup. Additionally, the scheduler on operator node[114] will use FaultID3 algorithm to monitor any faults. As commands are exchanged between the nodes to complete the task, they will be signed and verified until the task is completed.

The scheduler on robot node[118] will finish the main task by executing TaskID5, TaskID2, and TaskID6 in a similar method as above. Node that TaskID5 maps to TaskID2 on the operator node[114]. This task maps to OpAlg1 which involves getting and placing a tea packet in the cup. This task is a semi-autonomous task, where the operator needs to mark the locations of the cup and the tea packet, while the robot does the rest. This task is an example of how the UI will change for an operator depending on the task. In each subtask, the scheduler will monitor for faults and route the tasks and fault to appropriate handlers. Once a task is completed by reaching the end of a subTaskList or a termination of an algorithm or operator, the end-user is able to verify if the task did in fact get completed or if any faults have occurred during task execution. If the faults are generated, then the router is able to route to the appropriate entity able to handle the fault. Additionally, if the end-user is not satisfied with the task, he is able to route directly to an operator that is able to determine what went wrong.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

We claim:

1. A computer-implemented method for routing and scheduling tasks to facilitate control of any of a plurality of robots, the computer-implemented method comprising:

configuring an access control list (i) identifying a plurality of human operators that are each qualified to perform a first set of a plurality of tasks partly involving human control of a robot and (ii) identifying a plurality of algorithms for instructing a robot in performing a second set of the plurality of tasks fully autonomously without human control of the robot;

receiving a request identifying a robot and a task for the robot to perform;

determining based on a set of criteria, at least one (i) human operator from the plurality of human operators or (ii) algorithm from the plurality of algorithms for optimally controlling the robot in performance of the task;

providing a particular human operator from the plurality of human operators control of the robot when the task is one of the first set of tasks partly involving human control and the particular human operator is identified within the access control list as being qualified to optimally perform the task in conformance of the set of criteria, wherein the robot comprises a set of controls and sensors, and wherein providing the particular human operator control of the robot comprises authorizing the particular human operator access to a first subset of the set of controls and sensors of the robot and preventing the particular human operator access to controls and sensors of the robot not within the first subset of the controls and sensors; and providing a particular algorithm from the plurality of algorithms control of the robot when the task is one of the second set of tasks the robot can complete fully autonomously and the algorithm comprises instructions for optimally completing the task fully autonomously in conformance of the set of criteria, wherein providing the particular algorithm control of the robot comprises authorizing the particular algorithm access to a different second subset of the set of controls and sensors of the robot and preventing the particular algorithm access to controls and sensors of the robot not within the second subset of the controls and sensors.

2. The computer-implemented method of claim 1, wherein the set of criteria comprises any of a cost and efficiency metric, wherein the cost metric identifies different costs associated with using any of the plurality of human operators and the plurality of algorithms to control the robot in performance of the task, and wherein the efficiency metric identifies different efficiencies associated with using any of the plurality of human operators and the plurality of algorithms to control the robot in performance of the task.

3. The computer-implemented method of claim 1 further comprising assigning a first identifier to the task and a different second identifier to uniquely identify each human operator of the plurality of human operators and each algorithm of the plurality of algorithms.

4. The computer-implemented method of claim 3, wherein providing the particular human operator control of the robot comprises authenticating control of the robot by the particular human operator during completion of the task by (i) routing to the robot for execution, instructions intended for the robot comprising the first identifier and the second identifier assigned to the particular human operator and (ii) blocking instructions intended for the robot not comprising both the first identifier and the second identifier assigned to the particular human operator, and wherein providing the particular algorithm control of the robot comprises authenticating control of the robot by the particular algorithm during completion of the task by (i) routing to the robot for execution, instructions intended for the robot comprising the first identifier and the second identifier assigned to the particular algorithm and (ii) blocking instructions intended for the robot not comprising both the first identifier and the second identifier assigned to the particular algorithm.

5. The computer-implemented method of claim 1, wherein the task is a first task, the method further comprising receiving a second request identifying the robot and a different second task for the robot to perform and reassigning control of the robot to a different human operator or a different algorithm than was used in performing the first task.

6. The computer-implemented method of claim 1, wherein said request originates from one of a user assisted by the robot, one of the plurality of human operators, and one of the plurality of algorithms.

7. The computer-implemented method of claim 1 further comprising detecting a fault in completing said task.

8. The computer-implemented method of claim 7 further comprising selecting one of (i) a second different operator from the plurality of human operators and (ii) a second different algorithm from the plurality of algorithms based on the fault and transferring control of the robot from either the particular operator or the particular algorithm to either of the selected second different operator or second different algorithm for resolving the fault.

9. A distributed system comprising:
a plurality of robots deployed to different user locations, each robot of the plurality of robots comprising a network interface for remotely receiving a plurality of instructions associated with any set of a plurality of tasks the robot performs, the plurality of instructions controlling operation of the robot; and
at least one system node comprising:
a processor;
a storage storing an access control list identifying (i) a plurality of human operators that are each qualified to perform some subset of the plurality of tasks partly involving human control of a robot and (ii) identifying a plurality of algorithms for instructing a robot in performing a subset of the plurality of tasks fully autonomously without human control of the robot;
a network interface receiving at least a first task and a second task a user requests a particular robot of the plurality of robots to perform; and
wherein the at least one system node, by operation of the processor, communicably couples to the particular robot using the network interface and schedules the particular robot in performance of the first task and the second task by (i) providing control of the robot in performance of the first task to any of a first algorithm and a first human operator, (ii) authenticating instructions issued to the robot in performance of the first task based on a first identifier identifying any of the first algorithm and the first human operator and a second identifier identifying the first task, (iii) monitoring the robot in performance of the first task, and (iv) providing control of the robot in performance of the second task to any of a different second algorithm and a different second human operator than used in controlling the robot in performance of the first task, wherein said authenticating comprises routing to the robot any instruction signed with the first identifier and the second identifier and blocking any instruction not signed with the first identifier and the second identifier.

10. The distributed system of claim 9, wherein each robot of the plurality of robots further comprises a plurality of actuators and sensors, and wherein the at least one system node, by operation of the processor, further detects a fault during performance of the first task by collecting a plurality of data values from the plurality of actuators and sensors of the robot when monitoring the robot and by identifying at least one data value of the plurality of data values deviating from a plurality of acceptable data values for the plurality of actuators and sensors in performance of the first task.

11. The distributed system of claim 10, wherein the at least one system node, by operation of the processor, further responds to the fault by transferring control of the robot from any of the first algorithm and the first human operator to any of a different third human operator from the plurality of human operators and a different third algorithm from the plurality of algorithms qualified to resolve the fault.

12. The distributed system of claim 9, wherein the at least one system node, by operation of the processor, further authorizes any of the first human operator and the first algorithm for performing the first task by issuing signed permissions configuring the robot to execute instructions from any of the first human operator and the first algorithm for a specified time period.

13. The distributed system of claim 9, wherein the at least one system node, by operation of the processor, obtains availability for completing the first task and costs and efficiencies associated with the first task from a different second system node.

14. A computer-implemented method comprising:
configuring an access control list (i) identifying a plurality of human operators that are each qualified to perform a first set of a plurality of tasks partly involving human control of a robot and (ii) identifying a plurality of algorithms for instructing a robot in performing a second set of the plurality of tasks fully autonomously without human control of the robot;
receiving a request identifying a robot and a task for the robot to perform;
assigning a first identifier to the task and a different second identifier to uniquely identify each human operator of the plurality of human operators and each algorithm of the plurality of algorithms;
determining based on a set of criteria, at least one (i) human operator from the plurality of human operators or (ii) algorithm from the plurality of algorithms for optimally controlling the robot in performance of the task;
providing a particular human operator from the plurality of human operators control of the robot when the task is one of the first set of tasks partly involving human control and the particular human operator is identified within the access control list as being qualified to optimally perform the task in conformance of the set of criteria, wherein providing the particular human operator control of the robot comprises authenticating control of the robot by the particular human operator during completion of the task by (i) routing to the robot for execution, instructions for the robot comprising the first identifier and the particular human operator assigned second identifier and (ii) blocking instructions for the robot not comprising both the first identifier and the particular human operator assigned second identifier; and
providing a particular algorithm from the plurality of algorithms control of the robot when the task is one of the second set of tasks the robot can complete fully autonomously and the algorithm comprises instructions for optimally completing the task fully autonomously in conformance of the set of criteria, wherein providing the particular algorithm control of the robot comprises authenticating control of the robot by the particular algorithm during completion of the task by (i) routing to the robot for execution, instructions for the robot comprising the first identifier and the particular algorithm assigned second identifier and (ii) blocking instructions for the robot not comprising both the first identifier and the particular algorithm assigned second identifier.

15. The computer-implemented method of claim 14, wherein providing the particular algorithm control of the robot comprises initializing the robot with the particular algorithm and commencing fully autonomous operation of the robot under control of said algorithm without human control.

16. The computer-implemented method of claim 14 further comprising monitoring performance of the task by the robot under control of any of the particular human operator and the particular algorithm.

17. The computer-implemented method of claim 16 further comprising terminating said control of the robot upon detecting completion of the task or a fault as a result of said monitoring.

18. The computer-implemented method of claim 17 further comprising transferring control of the robot to any of a different second human operator from the plurality of human operators or different second algorithm from the plurality of algorithms in order to resolve a fault encountered during said monitoring.

19. The computer-implemented method of claim 16 further comprising generating a fault during said monitoring, wherein generating the fault comprises collecting (i) actuator values from a plurality of actuators of the robot and (ii) sensor data from a plurality of sensors of the robot and identifying at least one of either of the actuator values and the sensor data deviating from a set of acceptable actuator values and a set of acceptable sensor data for said task.

20. The computer-implemented method of claim 19 further comprising selecting,
based on the at least one actuator value or sensor data deviating from the set of acceptable actuator values and the set of acceptable sensor data for said task, at least one (i) different second human operator from a plurality of available human operators or (ii) different second algorithm from the plurality of algorithms qualified to resolve the fault and initializing the robot in resolving the fault by transferring control of the robot to the selected different second human operator or different second algorithm.

\* \* \* \* \*